United States Patent
Al-Dhubaib et al.

(10) Patent No.: US 7,319,961 B2
(45) Date of Patent: Jan. 15, 2008

(54) VOICE RECOGNITION TECHNOLOGY TO CAPTURE GEOSCIENCE DATA

(75) Inventors: Tofig A. Al-Dhubaib, Dhahran (SA); Ibrahim A. Al-Jallal, Aramco Dhahran (SA); Dave L. Cantrell, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 846 days.

(21) Appl. No.: 10/794,474

(22) Filed: Mar. 4, 2004

(65) Prior Publication Data

US 2005/0197841 A1    Sep. 8, 2005

(51) Int. Cl.
*G10L 15/00*    (2006.01)
(52) U.S. Cl. .................. 704/270; 704/275
(58) Field of Classification Search ............. 704/270, 704/275
See application file for complete search history.

(56) References Cited

U.S. PATENT DOCUMENTS

| | | | |
|---|---|---|---|
| 5,051,924 A | 9/1991 | Bergeron et al. | |
| 5,231,670 A | 7/1993 | Goldhor et al. | |
| 5,465,378 A | 11/1995 | Duensing et al. | |
| 5,924,069 A | 7/1999 | Kowalkowski et al. | |
| 5,960,399 A | 9/1999 | Barclay et al. | |
| 5,970,458 A | 10/1999 | Petkovsek | |
| 5,970,460 A | 10/1999 | Bunce et al. | |
| 5,995,936 A | 11/1999 | Brais et al. | |
| 6,047,257 A | 4/2000 | Dewaele | |
| 6,122,614 A | 9/2000 | Kahn et al. | |
| 6,173,259 B1 | 1/2001 | Bijl et al. | |
| 6,185,537 B1 | 2/2001 | Oh et al. | |
| 6,282,154 B1 | 8/2001 | Webb | |
| 6,304,848 B1 | 10/2001 | Singer | |
| 6,377,965 B1 * | 4/2002 | Hachamovitch et al. | 715/534 |
| 6,405,165 B1 | 6/2002 | Blum et al. | |
| 6,415,256 B1 | 7/2002 | Ditzik | |
| 6,434,527 B1 | 8/2002 | Horvitz | |
| 6,813,603 B1 * | 11/2004 | Groner et al. | 704/235 |
| 2003/0154085 A1 | 8/2003 | Kelley | |
| 2004/0172598 A1 | 9/2004 | Hammerich et al. | |

FOREIGN PATENT DOCUMENTS

GB    2 389 499 A    12/2003

* cited by examiner

*Primary Examiner*—Daniel Abebe
(74) *Attorney, Agent, or Firm*—Abelman, Frayne & Schwab

(57) ABSTRACT

A hands-free system for capturing data and generating reports recognizes speech as text and commands to create a set of entries intended to have a mathematical relationship to each other such that, if these entries fail to satisfy the relationship, a voice synthesizer generates a warning signal to indicate an error by the user.

10 Claims, 2 Drawing Sheets

VOICE RECOGNITION TECHNOLOGY TO CAPTURE GEOSCIENCE DATA

FIELD OF THE INVENTION

This invention relates to the use of voice recognition technology to facilitate hands-free capture of geoscience data in real time.

BACKGROUND OF THE INVENTION

In data-capture geoscience processes such as core description and well stratigraphy description, the geologist's eyes and hands are busy all the time. He needs to review the samples and equipment readouts and to handle and position the samples. He may jot down notes on paper and then reenter the data into a computer at a later time, or may enter some data directly into the computer. However, given that the geologist's hands are often soiled with acids, chemical stains and dirty rocks, it can be difficult for him to record the data by either typing on a computer keyboard or writing longhand in a log. The process has been cumbersome, error-prone, tedious and inefficient.

This is particularly true when the geologist is viewing a sample through a microscope, such as in petrographic descriptions, micropaleontology and palynology, where he spends most of his time going back and forth between the microscope and the paper.

Recently, hands-free voice recognition data capture systems have been developed which enable a doctor, for example, to examine a patient or sample while simultaneously describing his results out loud. The system receives the spoken words and records them in accordance with established rules to capture the data in a predetermined format so that the recorded data can later be more easily accessed and reviewed.

Many examples of such systems are now available, each with features adapted to the particular application being assisted. For example, U.S. Pat. No. 5,231,670 to Goldhor et al. is directed to a general scheme for utilizing voice recognition to fill out forms. U.S. Pat. No. 5,924,069 to Kowalkowski et al. describes the use of voice recognition technology in conjunction with a portable PC and appropriate software for the entry of information and fields.

Also, U.S. Pat. No. 5,960,399 to Barclay et al. describes the use of speech recognition technology to fill out and file forms over the Internet. U.S. Pat. No. 6,405,165 describes a physician's work station that includes a headset, microphone, transmitter, recording and voice recognition system for completing a physician's report. U.S. Pat. No. 5,051,924 to Bergeron et al. is directed to a method and apparatus for preparing reports utilizing a voice recognition system that responds to predetermined trigger phrases.

These patents are merely examples of the many types of systems that have been developed. In the case of geoscience, however, no such system has been developed to respond specifically to the needs of the working geologist. In particular, in the examination of geological specimens, many related measurements are performed on a specimen, but the specimen is often destroyed in the examination process. Therefore, it is important to ensure that not only does the voice recognition technology properly recognize what the geologist says and that the system properly files the data in the correct position within the report, but also that the interrelationship of the data be recognized in a way that prevents irremedial errors.

SUMMARY OF THE INVENTION

It is therefore an object of the present invention to provide a hands-free voice recognition capture system for geoscience applications that avoids the above-described difficulties of the prior art.

The above and other objects are achieved by the present invention which, in one embodiment, is directed to a hands-free system for generating a geoscience report, the report being designed to include a number of entries, where a first plurality of the entries are directed to a spreadsheet including a matrix within the report.

The system comprises a speech input for receiving units of speech, each unit of speech being either a command or text, and a speech recognition system for recognizing the content of each unit of speech and for encoding each unit of speech into a respective unit of data such that, based upon the recognized content of each unit of speech, that unit of speech is identified as a command having a respective unit of command data or as text having a respective unit of text data.

The system further comprises a voice synthesizer for synthesizing audible speech signals, where the voice synthesizer, in response to a received one of the units of data, generates an audible speech signal representative of the recognized content of the respective unit of speech, a control for sending selected ones of the units of data to the voice synthesizer and a vocabulary manager for receiving each unit of text data for determining a respective entry to be included in the report in accordance with a defined first set of rules.

Still further, the system comprises a navigation manager for receiving each unit of command data for determining a course of action in generating the report in accordance with the received unit of command data and a defined second set of rules, the second set of rules including a set of identifying rules for identifying a position in the matrix of an entry when that entry is one of the first plurality of entries, where a second plurality of the entries is defined as a subset of the first plurality of entries, the second plurality of entries being intended to have a predetermined mathematical relationship to each other.

In accordance with an advantageous aspect of the invention, the first set of rules includes a rule for determining whether or not a specific entry, when the specific entry is one of the second plurality of entries, is in accordance with the predetermined mathematical relationship based upon at least one other of the second plurality of entries. When the specific entry is determined by the determining rule to be not in accordance with the predetermined mathematical relationship, the synthesizer generates a warning signal to indicate an error.

In a preferred embodiment, the set of identifying rules includes a rule for moving a cursor from a current position in the matrix to a new position in the matrix in response to a spoken command for moving. When the spoken command for moving indicates cursor movement within the matrix by a specified amount in a specified direction of the matrix, the rule for moving moves the cursor within the matrix from the current position by the specified amount in the specified direction.

These and other objects, features and advantages of the present invention will be apparent from the following detailed description of the preferred embodiments taken in conjunction with the following drawings, wherein like reference numerals denote like elements.

DETAILED DESCRIPTION OF THE PREFERRED EMBODIMENTS

Figure 1:
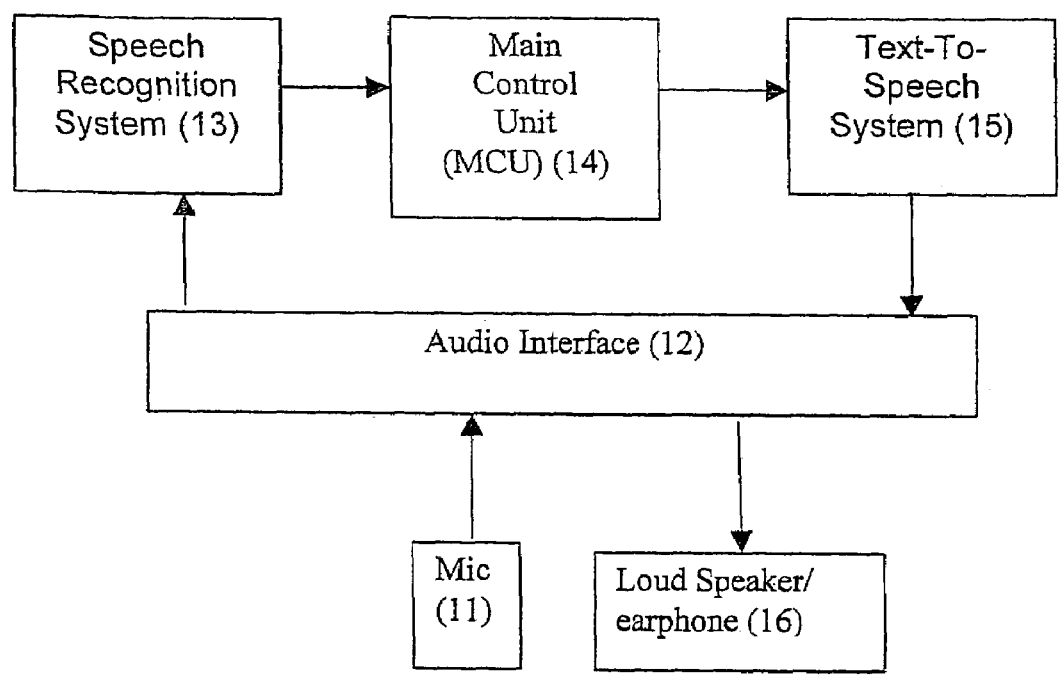
FIG. 1 is a schematic block diagram of a preferred embodiment of the system in accordance with the present invention.

Before discussing the preferred embodiments, a description of current data gathering processes will be given to clarify the problems solved by the present invention. The first major type of study is lithology, which is the study of the macroscopic nature of the mineral content, grain size, texture fabric and color of rocks. In the oil and gas industry, samples of rock from different depths are studied to determine the characteristics of the potential hydrocarbon reserves. The samples are usually in the form of cores, which are cylindrical samples of rock retrieved from a well. The average core length is 60 feet and is, therefore, usually stored in 20 trays, each three feet long. Frequently, several cores are taken from each well. A smaller 1" or 1.5" plug is extracted from each foot or half-foot throughout the core.

To record the data, the geologist generally starts with a sheet of paper presenting a matrix (rows and columns) that lists core depth in the first column. Each subsequent column has corresponding positions for respective categories of data that need to be completed. Each category can have subcategories, and in some cases the entries in a column or row should have a predetermined mathematical relationship to each other, e.g. add up to 100%.

Generally about 70% of the core description process is done at the warehouse, with the remainder being completed at the office using the sample plugs.

Petrography is the examination of rocks in thin sections. Rock slices can be glued to a glass slide and the rock ground to 0.03 mm thickness in order to observe the mineralogy and texture using a transmitted-light Polarizing Petrographic Microscope. Samples of sedimentary rock can be impregnated with blue epoxy resin to highlight porosity, which is the percentage of pore volume or void space, i.e. the volume within the rock that can contain gas or fluid.

To collect this data, generally the geologist types a narrative qualitative description. Free text is used to describe a larger sample of the rock. A mineral point count is entered into the sheet, which is categorized and used for detailed petrographic analysis. Some of the data is then subsequently recategorized. For example, different mineral cement combinations are put into a general category called "Total Cements." Similarly, combinations of different quartz grain types or feldspar types are categorized into "Total Quartz" and "Total Feldspar."

Generally speaking, this process identifies minerals and the size of the grains. In many cases, 10-50 types of minerals may be identified. The process can take about 45 minutes per sample.

Another process is micropaleontology. This is the study of microfossils, the majority of which are too small to be seen without the use of a microscope. Marine microfossils such as foraminifera are important for stratigraphic correlation. Usually, in identifying the fossils, a dictionary of about 1500 names is used. The process time is generally about 20 minutes per plug, with about 500 plugs per well and with samples being examined from thin sections taken from the core plugs.

Still another process is palynology, the study of pollen and the spores of plants. Samples are prepared from the insoluble residue after acid dissolution of a piece of core and examined on a glass slide with a petrographic microscope. The types of pollen and palynomorphs are identified, giving information on the geologic age and environment of deposition of the sample. The typical process time here is about 30 minutes to 1 hour per sample, but it can go up to an entire day for each sample.

These types of core descriptions and manual data collection have often been done differently by different geologists. Accordingly, there has been no standard procedure for collecting this information.

The present invention provides such a standard procedure that not only regulates the collection of data but also facilitates it. In the present invention, the application of voice recognition technology to the automatic generation of geoscience reports allows geologists to enter their rock sample descriptions by speaking directly to a computer. This improves the data capture processes and alleviates some of the discomforts inherent in a rock laboratory environment. As noted above, because of the dirt, the geologists tended to take handwritten notes and then transcribe the notes upon their return to the office. Unfortunately, this usually meant that during the data entry at the office they no longer had the rocks available for referencing.

The present invention is advantageously embodied in a system of four interactive voice-based computer applications designed and implemented to enable geologists to enter core and thin section description information into specified formats with hands and eyes free. These applications format the data for further processing, for example by other commercially available programs such as WellCAD and StrataBugs.

The interactive system is advantageous in a number of ways. First, it ensures a complete focus on the examined sample. The system receives the data in a hands-free manner and then audibly advises the geologist of the status of the process. The geologist is thereby kept advised of the location of the cursor on the screen (and hence where he is in the application) without looking at the screen.

The geologist is also told the outcome of the speech recognition process (e.g. whether it results in a move of the cursor or data entry). Advantageously, the system confirms the entries by playback.

The system has three different definitions that apply to each piece of data: In, Out and Written, respectively corresponding to recognition, playback and data entry. The system is able to handle each one according to the function required.

In accordance with the present invention, correction of data entries is permitted when, for example, the voice recognition software misrecognizes the spoken text, allowing the user to delete the error or undo the move. Additionally, and in accordance with an important aspect, the system enables the recognition of certain errors even when the spoken text has been correctly recognized. This will be discussed in greater detail below.

In another aspect, the system represents features in columns, or more generally presents at least some of the data entries in a matrix arrangement. Each column can have its own pre-defined vocabulary, and movement of the cursor into a column automatically switches to the pre-defined vocabulary of that column. As the geologist describes different types of data corresponding to different columns, the application switches to the corresponding column dictionaries in real time. Moreover, the user can extend the data field vocabularies, personalizing the generic data field dictionary. The user can then switch from one type of data to another freely and is not restricted to sequential data entry.

Advantageously, the application is adaptive to the users and the surrounding working environment. For example, geologists in one laboratory often come from different countries and have different accents and vocabularies. The application can be made tolerant of these differences. Also, some working environments may face different noise levels or other factors affecting how well spoken words can be received and recognized. In environments where large rock samples are handled, the background noise can be substantial during peak work hours. The present application must be able to overcome this difficulty.

Thus the present invention combines the use of an Automatic Speech Recognition (ASR) system and a Text-To-Speech (TTS) system in the geological laboratory. The combined system is designed to capture and verify interpreted data and to generate reports in spreadsheet form during the examination of rock samples and thin sections. It is an intelligent system designed to perform specific complicated tasks.

In particular, in handling the types of information gathering discussed above, the system allows the geologist to electronically navigate through the data entry sheet by columns and/or rows, or by rock, core and plug sample characteristics such as depth, box and plug using directive voice commands.

The system vocabularies dynamically switch to the associated geological terminology table as the user navigates between data fields to enhance the recognition engine performance and data capture accuracy.

FIG. 1 shows a schematic block diagram of a preferred embodiment of the hands-free system 10 in accordance with the present invention. The system 10 enables the geologist to generate a report designed to include a number of entries, where at least a first plurality of the entries form a matrix within the report.

The system 10 includes a microphone 11 or other voice input means attached to an audio interface 12. The microphone 11 conventionally receives units of speech, e.g. words or phrases, spoken by the user. In this embodiment, each unit of speech is either a command (e.g. "MOVE UP 2" or "ERASE THE LAST ENTRY") or text (e.g. "QUARTZ 20%"). The audio interface 12 converts the units of speech into digital data that can be processed by the speech recognition system 13, which recognizes the content of each unit of speech and converts it into a respective unit of data. The speech recognition system 13 is a conventional, commercially available system such as the system marketed by International Business Machines (IBM) under the trademark ViaVoice.

Speech recognition systems are designed to recognize selected vocabularies and also allow for the addition of user-specific vocabulary. The speech recognition system 13 is also a speaker-dependent system, i.e. each user trains the system to recognize his/her voice.

Once the spoken words are recognized by the speech recognition system 13, the corresponding units of data are sent to a Master Control Unit (MCU) 14. In this embodiment, the MCU 14 is responsible for the generation and control of the spreadsheet form and will be described in more detail below.

In an advantageous aspect, after it has recognized the user's words, the present invention provides an audible message to the user to let the user confirm that his words have been properly interpreted or, in an especially advantageous aspect, that the right words were spoken. To this end, the MCU 14 acts as a control through a confirmation message generator 27 that sends a confirmation text message to a Text-To-Speech (TTS) system 15. TTS systems are also conventional and commercially available, such as the system marketed by IBM under the trademark ViaVoice Outloud.

The TTS system 15 receives a sequence of words, typically coded in ASCII, and synthesizes a selected corresponding voice signal. The synthesized voice signals are output to the speaker or earphone 16 through the audio interface 12.

Figure 2:
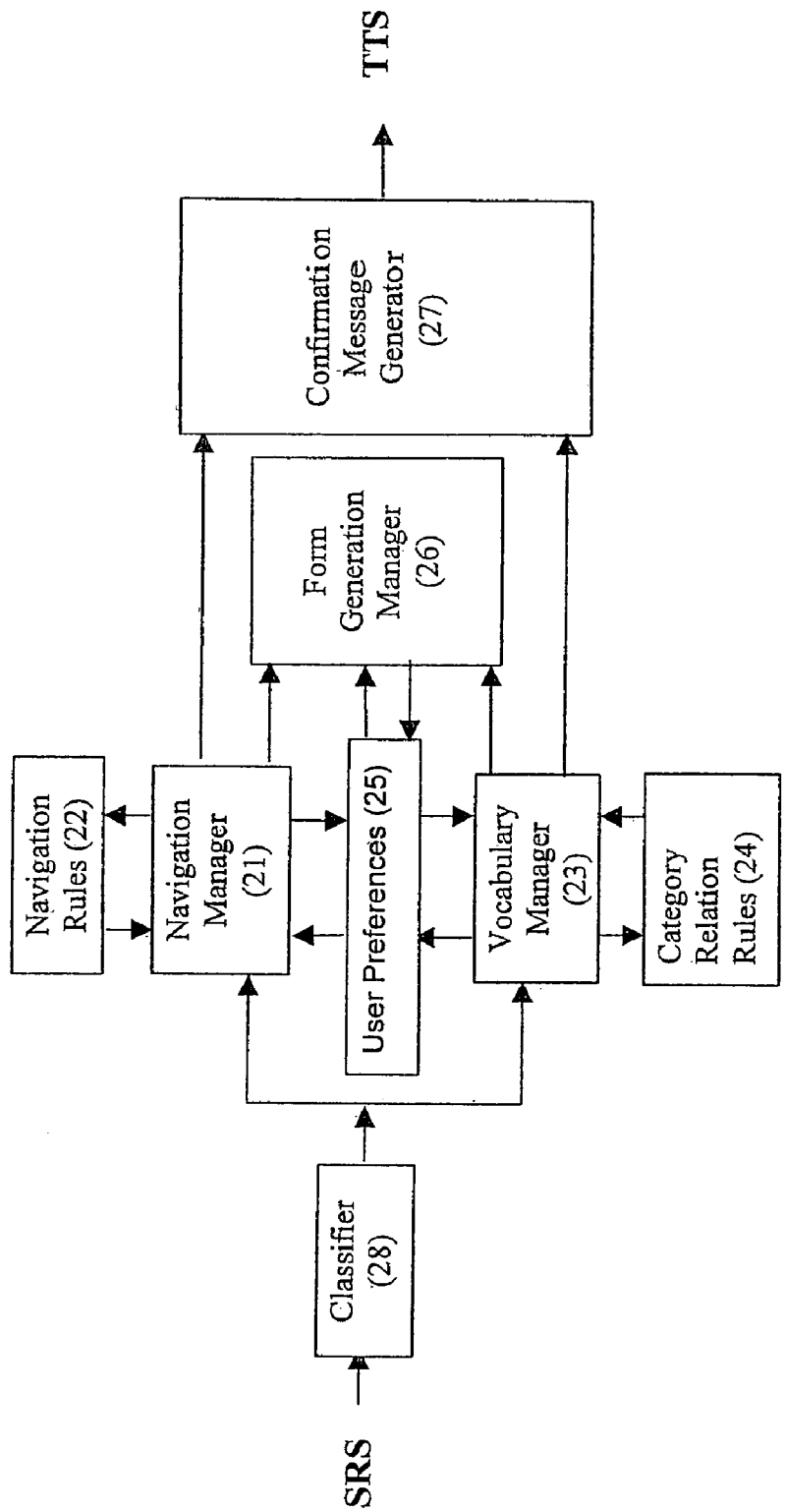
FIG. 2 is a schematic block diagram of the Master Control Unit of the system of FIG. 1.

The MCU 14, as shown in FIG. 2, is the main core of the system that is responsible for the generation and control of the spreadsheet form. The units of data having recognized content from the speech recognition system 13 are the input to the MCU 14. The units of data are first fed to a classifier 28 that, based upon the recognized content of each unit of speech, identifies that unit of speech as either a permissible command having a respective unit of command data or permissible text having a respective unit of text data. If the unit of data is command data, the classifier 28 directs it to a navigation manager 21. If the unit of data is text data corresponding to a permissible word entry that is a member of the vocabulary belonging to the current active column, the classifier 28 sends it to a vocabulary manager 23.

If the unit of speech is neither of these two types, the MCU 14 can either ignore it or issue an error message.

The navigation manager 21 is the component that is responsible for the interpretation of commands and determines the appropriate course of action in generating the report based upon a set of predefined navigation rules 22. Rules 22 include all conventional rules for setting up and filling out a report, as well as a subset of identifying rules for identifying a position in the matrix of a current entry when that entry is one that should be positioned in the matrix.

The navigation manager 21 sends instructions to effect the action to a form generation manager 26, which will execute them. For example, if the cursor is currently at a position in column X and row Y of the matrix, the spoken command "move up (a number N)" will be recognized by the speech recognition system 13 and will cause the cursor to move to a new position in column X and row Y–N (Y minus N).

After every action, or after certain designated actions, the navigation manager 21 will also trigger the confirmation message generator 27 to generate a message to alert the user of what action that has been taken. This is achieved by sending the appropriate data to the TTS system 15 (see FIG. 1). In the above example, the message might be "cursor moved, current position is X, Y–N" or "please enter (name of entry position, e.g. quartz percentage)". Of course, other messages can be used depending on the particular application.

The vocabulary manager 23 is the component that is responsible for the interpretation of the spoken text, and it fills in the report with the appropriate entry based upon a another set of predefined category relation rules 24. In an important aspect of the present invention, these rules 24 include rules reflecting relationships among the different entries in the same category.

Specifically, the present invention provides an advantageous process whereby certain errors in the content of the data entries can be recognized and corrected. Thus, the data entries in a particular column of the matrix may be intended to reflect a predetermined mathematical relationship. For example, the entries may reflect percentages of some feature of the sample that should add up to 100%. In accordance with the present invention, once the system 10 has filled this column with the percentages, it can check to see if the percentages add up to 100%. Alternatively or in addition, it can check after each entry to see if the total exceeds 100%. It should be noted that this may happen even if the application correctly recognizes the percentages announced by the geologist, i.e. the geologist has made a mistake.

In this event, the system 10 can alert the geologist to the error, for example, by synthesizing an announcement from the TTS system 13 that the entries in the specified column do not meet the standard. Other warning signals, audible or otherwise, may be used as appropriate.

Also, in this event or at any other time that the user realizes that an entry needs to be changed for any reason, the permissible commands include editing commands such as "erase last entry" or "change the entry at X, Y to _____". Other conventional editing commands are also permissible as desired.

Thus, the present invention provides an advantageous hands-free, eyes-free system for the geologist to prepare an accurate data-capture report in real time even in the dirty, noisy and disruptive environment of the geoscience lab.

While the disclosed system has been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

We claim:

1. A hands-free system for assisting in capturing data and generating a report during examination of rock samples and/or thin sections, said system being designed to include a plurality of entries, where a first number of the entries form a matrix within the report, said system comprising:
    a speech input for receiving units of speech, each unit of speech being one of a command and text;
    a speech recognition system connected to said input for recognizing a content of each unit of speech and for encoding each unit of speech into a respective unit of data such that, based upon the recognized content of each unit of speech, that unit of speech is identified as a command having a respective unit of command data or as text having a respective unit of text data;
    a voice synthesizer for synthesizing audible speech signals, where said voice synthesizer, in response to a received one of the units of data, generates an audible speech signal representative of the recognized content of the respective unit of speech;
    a control for sending selected ones of the units of data to said voice synthesizer;
    a vocabulary manager for receiving each unit of text data for determining a respective entry to be included in the report in accordance with a defined first set of rules; and
    a navigation manager for receiving each unit of command data for determining a course of action in generating the report in accordance with the received unit of command data and a defined second set of rules, the second set of rules including a set of identifying rules for identifying a position in the matrix of an entry when that entry is one of the first plurality of entries,
    where a second plurality of the entries is defined as a subset of the first plurality of entries, the second plurality of entries being intended to have a predetermined mathematical relationship to each other,
    where the first set of rules includes a rule for determining whether or not a specific entry, when the specific entry is one of the second plurality of entries, is in accordance with the predetermined mathematical relationship, and
    where, when the specific entry is determined by the determining rule to be not in accordance with the predetermined mathematical relationship, said synthesizer generates a warning signal to indicate an error.

2. The system of claim 1, wherein the warning signal is an audible signal.

3. The system of claim 1, wherein the warning signal is an audible speech signal.

4. The system of claim 1, wherein the set of identifying rules includes a rule for moving a cursor from a current position in the matrix to a new position in the matrix in response to a command for moving.

5. The system of claim 4, wherein when the command for moving indicates cursor movement within the matrix by a specified amount in a specified direction of the matrix, the rule for moving moves the cursor within the matrix from the current position by the specified amount in the specified direction.

6. The system of claim 1, wherein the permissible commands include a command for creating an entry.

7. The system of claim 1, wherein the permissible commands include a command for changing an entry.

8. The system of claim 1, wherein the mathematical relation is between relative percentages indicated by the first plurality of entries.

9. The system of claim 1, wherein the first plurality of entries are the entries intended to fill one column of the matrix.

10. The system of claim 1, further comprising a classifier connected to said speech recognition system for, based upon the recognized content of each unit of speech, identifying that unit of speech as a command having a respective unit of command data or as text having a respective unit of text data.

* * * * *